(No Model.)
W. BRAYTON.
GATE.
No. 454,026. Patented June 16, 1891.
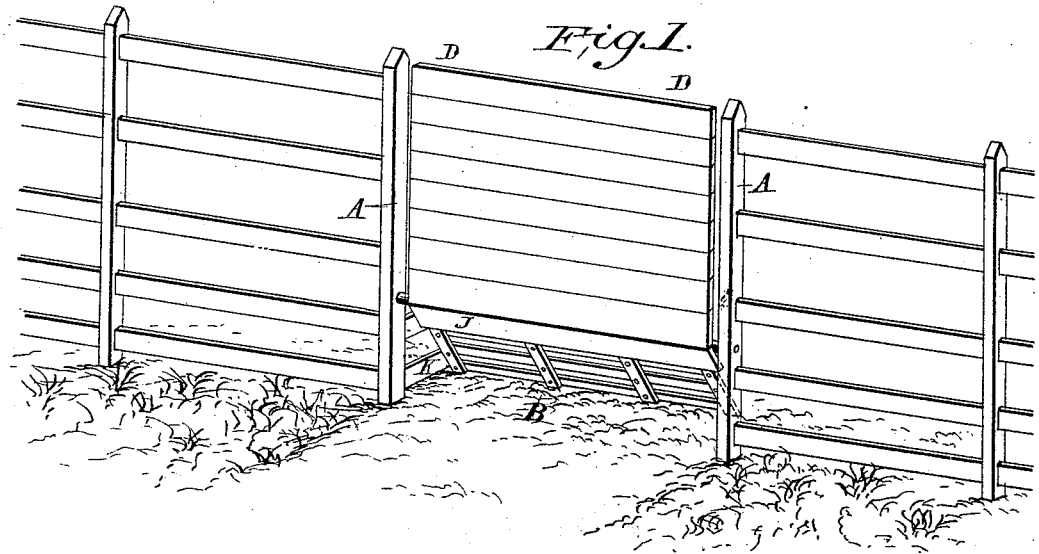
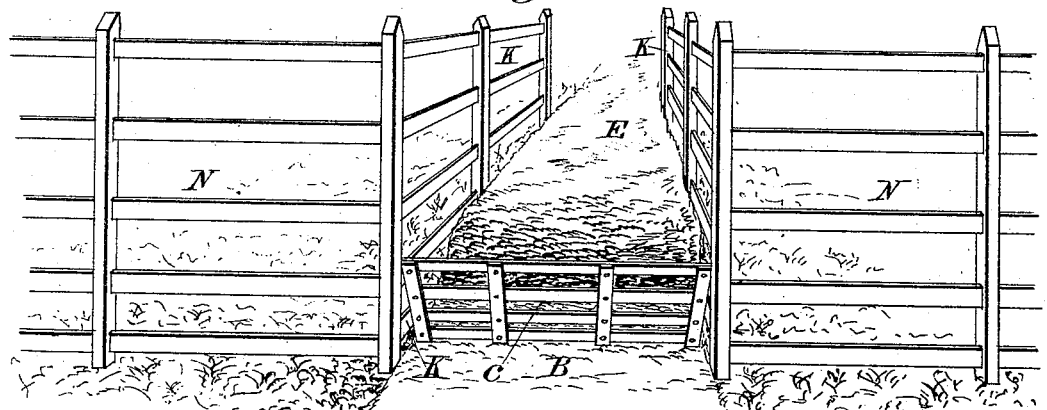
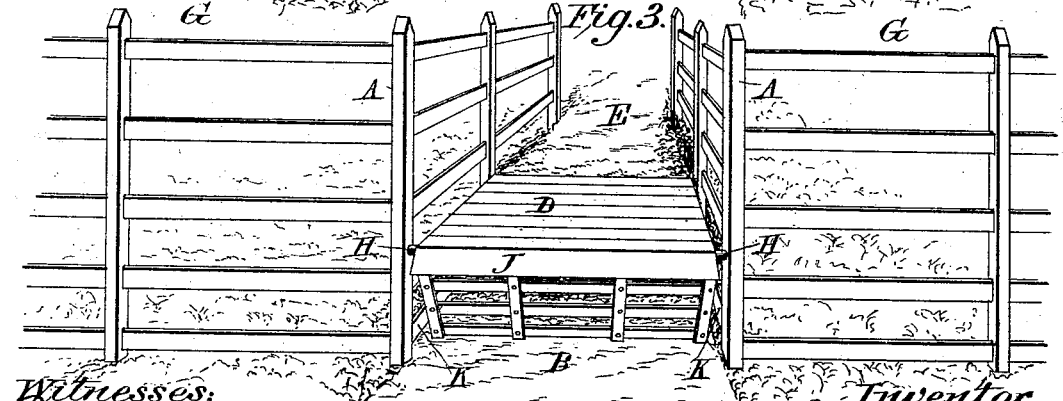
Witnesses:
Villard Perin
A. H. Munman
Inventor:
Wm Brayton

UNITED STATES PATENT OFFICE.

WILLIAM BRAYTON, OF FLOYD, IOWA.

GATE.

SPECIFICATION forming part of Letters Patent No. 454,026, dated June 16, 1891.

Application filed December 12, 1890. Serial No. 374,511. (No model.)

*To all whom it may concern:*

Be it known that I, WILLIAM BRAYTON, a citizen of the United States, residing at Floyd, in the county of Floyd and State of Iowa, have invented a new and useful gate and device which by its peculiar construction permits horses, cattle, and sheep to pass and return, but prevents and retains hogs, of which the following is a specification.

In the drawings, Figure 1 is an inside view of a fence inclosing a pasture or farm-yard, showing the gate in position to close the entrance to all animals. Fig. 2 is a similar view showing the entrance with the cattle-gate removed. Fig. 3 shows the cattle-gate in its open position.

A A are posts, one at each side of the entrance, which in this case are the end posts of the fence-sections. At a convenient height bearings are formed in or upon these posts to receive the journals H of the gate D, which closes the opening when erect, as in Fig. 1, but when turned down becomes a platform over which the cattle may pass in and out. The part of gate D below its journals is at an angle with the upper part, and when the gate is let down projects into the inclosure, forming a slanting shelf J, broad and steep enough to prevent a hog from gaining a foothold on the platform. The space between posts A A, beneath the journals of gate D, is filled by a low fence-panel C, which may either be perpendicular or inclined, as shown, and which must be set so far back that a hog attempting to climb upon the platform cannot reach it with his hind feet.

The sides of the platform D are preferably guarded by fence-panels K, and the ground in the approach E should be graded up, so as to support it properly. By providing two or more sets of bearings for the journals H, the devices may be adjusted according to the size of the stock to be confined.

The operation of my device is so obvious that it needs no further explanation.

Having fully described my invention, what I claim as new, and desire to secure by Letters Patent, is—

The platform D in connection with the slanting shelf J and low fence-panel C, all substantially as shown, for the purpose specified.

WILLIAM BRAYTON.

Witnesses:
  A. J. EYCHANER,
  GEO. WETZEL.